United States Patent
Chialastri et al.

(10) Patent No.: US 11,709,529 B2
(45) Date of Patent: Jul. 25, 2023

(54) VARIABLE ENHANCED PROCESSOR PERFORMANCE

(71) Applicant: HEWLETT PACKARD ENTERPRISE DEVELOPMENT LP, Houston, TX (US)

(72) Inventors: David Scott Chialastri, Houston, TX (US); Vincent W. Michna, Houston, TX (US); Nilashis Dey, Houston, TX (US); Yasir Jamal, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/499,393

(22) Filed: Oct. 12, 2021

(65) Prior Publication Data
US 2023/0109810 A1   Apr. 13, 2023

(51) Int. Cl.
*G06F 1/26*   (2006.01)
*G06F 1/20*   (2006.01)
*G06F 11/30*  (2006.01)

(52) U.S. Cl.
CPC ........... *G06F 1/206* (2013.01); *G06F 1/26* (2013.01); *G06F 11/3058* (2013.01)

(58) Field of Classification Search
CPC ......... G06F 1/206; G06F 11/3058; G06F 1/26
USPC ........................................................ 713/300
See application file for complete search history.

(56) References Cited

U.S. PATENT DOCUMENTS

| | | | |
|---|---|---|---|
| 7,694,159 B2 | 4/2010 | Cepulis | |
| 8,131,515 B2 | 3/2012 | Sharma et al. | |
| 8,131,576 B2 | 3/2012 | Rothberg et al. | |
| 8,804,397 B2 | 8/2014 | Aleksic et al. | |
| 9,158,345 B1 * | 10/2015 | Rice | G06F 1/206 |
| 9,523,730 B2 | 12/2016 | Steit | |
| 10,828,672 B2 | 11/2020 | Stahl et al. | |
| 2003/0188211 A1 * | 10/2003 | Chen | G06F 1/206 |
| | | | 713/322 |
| 2006/0095796 A1 * | 5/2006 | Chotoku | G06F 1/206 |
| | | | 713/300 |
| 2009/0322150 A1 * | 12/2009 | Cline | G06F 1/206 |
| | | | 307/35 |
| 2013/0339777 A1 * | 12/2013 | Varma | G06F 1/26 |
| | | | 713/340 |
| 2014/0201557 A1 * | 7/2014 | Darrington | G06F 11/3062 |
| | | | 713/340 |
| 2015/0089251 A1 * | 3/2015 | Carlson | G06F 1/3243 |
| | | | 713/300 |
| 2017/0212575 A1 * | 7/2017 | Wang | G06F 1/206 |
| 2018/0283950 A1 | 10/2018 | Ge et al. | |
| 2019/0011963 A1 * | 1/2019 | Nguyen | G06F 1/3243 |
| 2019/0179721 A1 | 6/2019 | Kapoor et al. | |

(Continued)

*Primary Examiner* — Chun Cao
(74) *Attorney, Agent, or Firm* — Nolte Lackenbach Siegel (57) ABSTRACT

A compute device may include one or more processors operable at variable performance levels depending upon power supplied from a compute device power supply. A baseboard management controller of the compute device may periodically calculate an adjustment value for the power supply to adjust the power delivered to the one or more processors. The adjustment value may be calculated as a function of a thermal margin between the temperature of the one or more processors over time and a thermal operating limit of the one or more processors.

19 Claims, 6 Drawing Sheets

(56) References Cited

U.S. PATENT DOCUMENTS

2020/0217667 A1 7/2020 Kim et al.
2020/0218905 A1 7/2020 Wang et al.

* cited by examiner

VARIABLE ENHANCED PROCESSOR PERFORMANCE

BACKGROUND

Compute devices may contain one or more processors that may be operated at varying performance levels. One technique for enhancing the performance level of a processor is "overclocking," which involves adjusting the power supplied to the processor to a higher value. The higher power allows the processor to operate at higher internal clock speeds. Enhanced processor performance achieved through overclocking may also have an effect on the thermal conditions associated with processor operation.

BRIEF DESCRIPTION OF THE DRAWINGS

The present disclosure is best understood from the following detailed description when read with the accompanying figures, wherein.

It is emphasized that, in accordance with the standard practice in the industry, various features are not drawn to scale. In fact, the dimensions of the various features may be arbitrarily increased or reduced for clarity of discussion or illustration.

DETAILED DESCRIPTION

Illustrative examples of the subject matter claimed below are disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

As used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

As used herein, to "provide" an item means to have possession of and/or control over the item. This may include, for example, forming (or assembling) some or all of the item from its constituent materials and/or, obtaining possession of and/or control over an already-formed item.

In examples herein, processor performance in a compute device may be altered by dynamically adjusting power supplied to one or more processors in the compute device, enabling the one or more processors to operate at an increased (overclocked) system clock speed and thereby achieve enhanced processor performance. In some examples, the dynamic adjustment of power may be based upon periodic thermal measurements of the processors. Calculations may be periodically performed to dynamically define an enhanced processor performance level for the processors to optimize processor performance while ensuring that permissible thermal conditions are maintained in the compute device.

Figure 1:
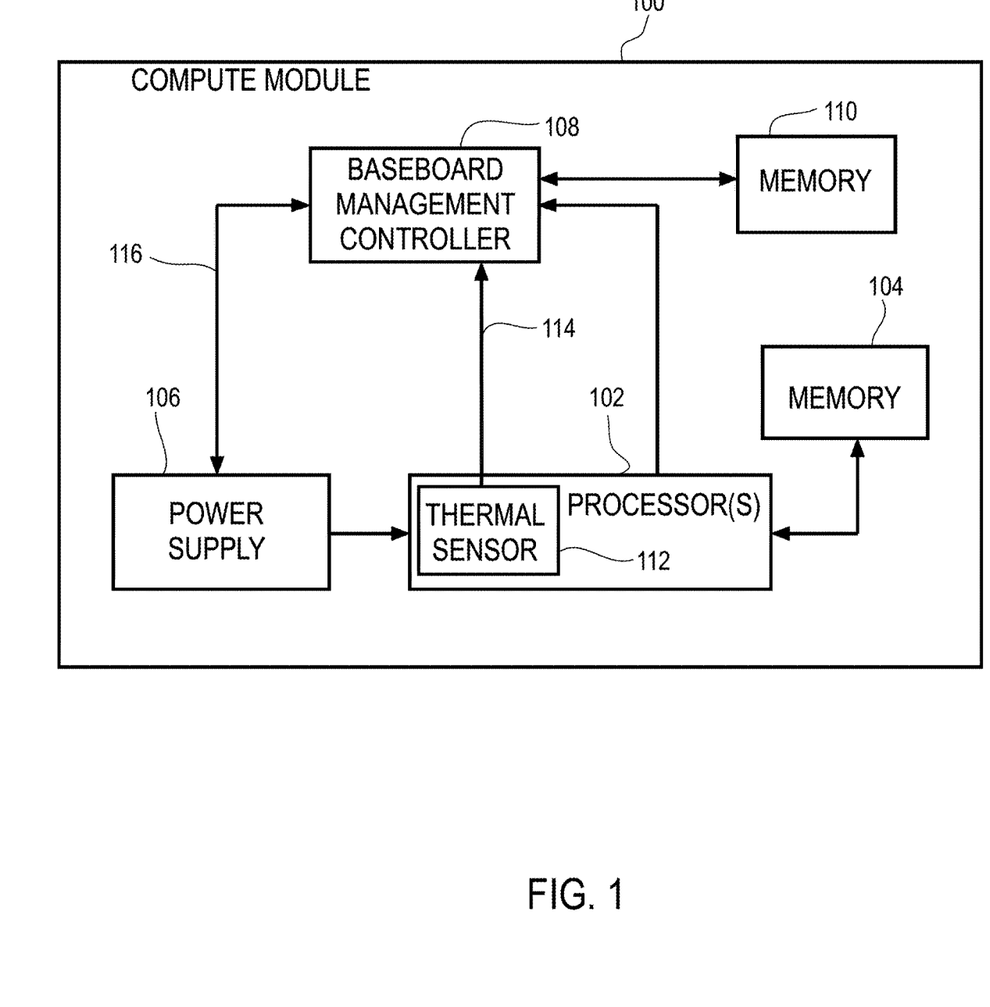
FIG. 1 is a block diagram of a compute device according to one or more examples.

FIG. 1 is a block diagram illustrating a compute device 100 according to one or more examples. As shown in FIG. 1, compute device 100 may include one or more processor(s) 102 and associated memory 104 which may contain data and programming instructions for controlling operation of processor(s) 102. Although a single memory 104 is shown in FIG. 1, in various examples, a compute device may contain more than one memory, for example, a separate memory 104 for each of the one or more processor(s) 102.

In various examples, processor(s) 102 may be, for example and without limitation, microcontrollers, central processing units ("CPUs"), digital signal processors ("DSPs"), programmed logic arrays ("PLAs"), application-specific integrated circuits ("ASICs"), or custom hardware processing circuits. Further, memory 104 may comprise any computer-readable medium that may be accessed by processor(s) 102, including, for example and without limitation, comprise random access memory ("RAM") including dynamic random-access memory ("DRAM"), static random-access memory ("SRAM") read-only memory ("ROM"), electrically-erasable/programmable read-only memory ("EEPROM"), compact disc ROM ("CD-ROM") or other optical disk storage, magnetic disk storage or other magnetic storage devices, or any combination thereof, or any other medium that may be used to carry or store desired program code in the form of instructions or data structures and that may be accessed by a computer. Disk and disc, as used herein, includes compact disc ("CD"), laser disc, optical disc, digital versatile disc ("DVD"), floppy disk and Blu-ray® disc where disks usually reproduce data magnetically, while discs reproduce data optically with lasers.

With continued reference to FIG. 1, compute device 100 may further include a power supply 106 for providing power to processor(s) 102. Although a single power supply 106 is shown in FIG. 1, in various examples more than one power supply 106 may be provided, particularly in implementations in which a compute device may include more than one processor 102.

In the example of FIG. 1, compute device 100 further includes a baseboard management controller ("BMC") 108 and associated memory 110. BMC 108 may be a remote server management processor embedded on a system board of compute device 100 to enable the configuring, monitoring and controlling of compute device 100 both locally and through remote servers coupled to compute device 100 (not shown in FIG. 1). Like processor(s) 102, BMC 108 may be, for example and without limitation, a microcontroller, central processing unit ("CPU"), digital signal processor ("DSP"), programmed logic array ("PLA"), application-specific integrated circuits ("ASIC"), or a custom hardware processing circuit. In various examples, memory 110 associated with BMC 108 may be separate from memory 104 associated with processor 102, and in some examples, may be firmware in the form of ROM or EEPROM containing data and programming instructions for controlling operation of BMC independently of operation of processor(s) 102. Further, although memory 110 associated with BMC 108 is shown separately from BMC 108 in FIG. 1, memory 110 may be directly incorporated into BMC 108.

Compute device 100 may further include at least one thermal sensor 112 associated with processor(s) 102. Thermal sensor 112 may operate to provide BMC 108 with real-time thermal (temperature) readings for processor(s) 102 during operation of compute device 100. In some examples, thermal sensor 112 may be an on-die digital thermal sensor incorporated into processor(s) 102. The thermal sensor 112 is optional and may be omitted in some embodiments. In examples which include thermal sensor 112, the thermal data may be provided to BMC 108 via a Platform Environment Control Interface ("PECI") 114 as shown in FIG. 1.

In one or more examples, the performance of processor(s) 102 may be modulated through adjustment of the power provided to processor(s) 102 by power supply 106. As noted above, depending upon the level of power provided to processor(s) 102, processor(s) 102 may be able to operate at higher internal clock speeds. Operating a processor at higher clock rates (overclocking) may require increased power to be provided to maintain the processor's operational stability. However, an overclocked processor may be unreliable or fail completely if the additional thermal load is not removed, or if power delivery components cannot meet increased power demands.

In examples herein, the level of the power provided to processor(s) 102 (e.g., the voltage and/or the current provided by power supply 106) may be adjusted up or down. Upward adjustment of power to processor(s) 102 may facilitate overclocking of processor(s) 102, i.e., operation of the processor at higher clock speeds, to achieve enhanced processor performance, under circumstances where the thermal operating limit for processor(s) 102 is not violated. The upper thermal operating limit of processor(s) 102 may be specified by the processor manufacturer. Downward adjustment of power to processor(s) 102 may be desirable when thermal conditions reduce the thermal margin between the temperature of processor(s) 102 and a maximum operating temperature for processor(s) 102. To this end, and as shown in FIG. 1, BMC 108 may be coupled to power supply 106 to enable BMC 108 to control the operation of power supply 106 in providing power to processor(s) 102.

Figure 2:
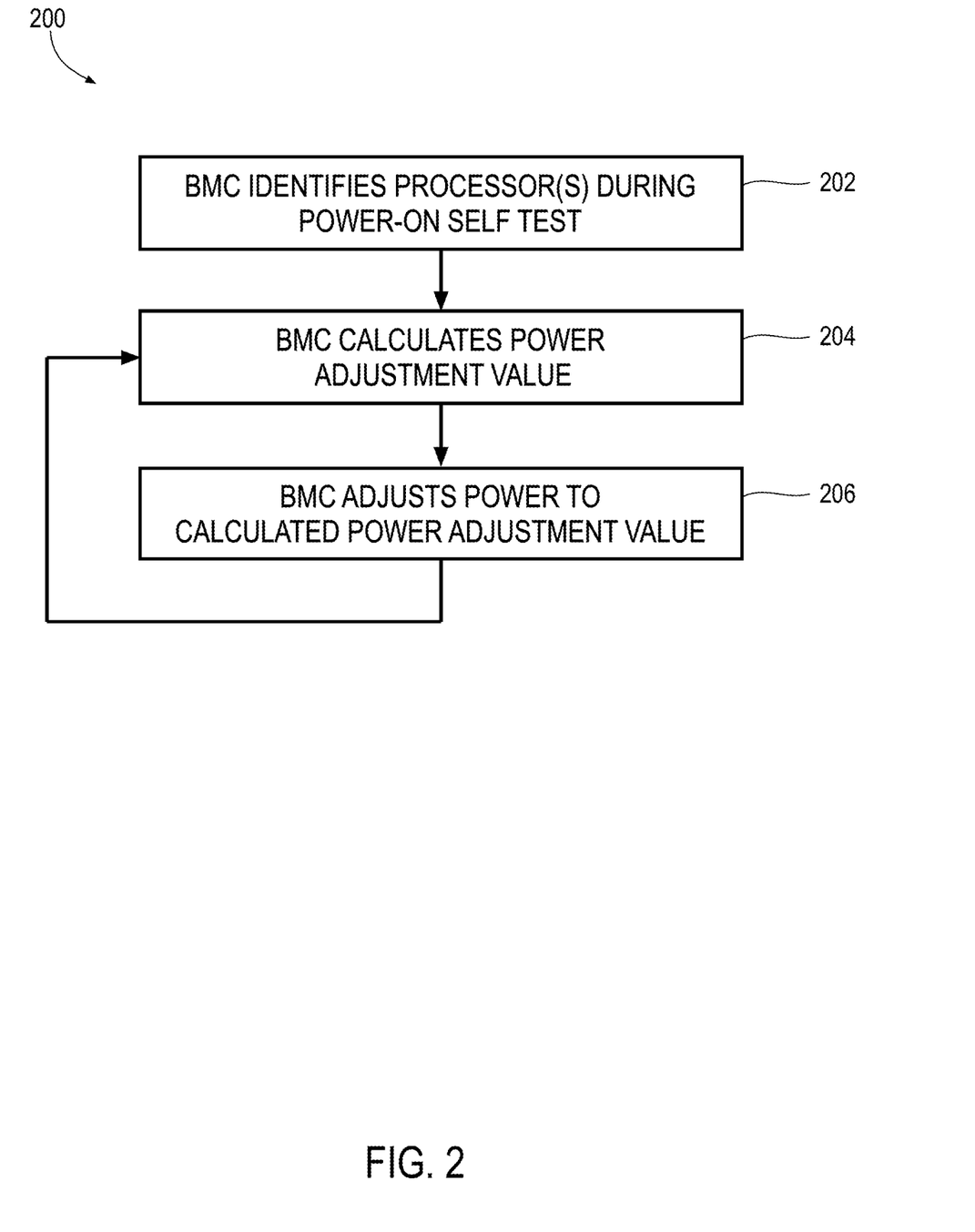
FIG. 2 is a flow diagram illustrating a method of operating a compute device according to one or more examples.

FIG. 2 is a flow diagram of a method 200 for operating compute device 100 according to one or more examples. In block 202 of method 200, BMC 108 identifies processor(s) 102. This identification may occur, for example, during the power-on self-test ("POST") of compute device 100. A POST is a process that a compute device may perform immediately each time it is powered on. Processor instructions for performing a POST may be contained in basic input-output system (BIOS) memory, which may be read-only memory (ROM), that are executed by a processor upon being powered up. In examples, BMC 108 may have access to the internal memory of processor(s) 102, which may include the sellable name, frequency, core count, etc. of the processor(s) 102. Using this information obtained during a POST, processor(s) 102 can be identified and associated with the data required by BMC 108.

Next in block 204 BMC 108 calculates a power adjustment value ("PowerAdj$_{PWM}$") for power supply 106. In one example, PowerAdj$_{PWM}$ is a proportional/integral/derivative ("PID") function calculated according to the following Equation (1):

$$PowerAdj_{PWM} = C_p \times CPUMargin_n + \qquad (1)$$
$$C_i \times \sum_{t=n-100}^{n} CPUMargin_n +$$
$$C_d \times \frac{(CPUMargin_n - CPUMargin_{n-1})}{t_n - t_{n-1}}$$

In Equation (1), $C_p$ is a proportional gain constant, $C_i$ is an integral gain constant, and $C_d$ is a derivative gain constant. In examples, $C_p$, $C_i$, and $C_d$ may be predetermined by being programmed into memory 110 for BMC 108. These constants determine the aggressiveness of processor performance enhancement achieved according to method 200 of FIG. 2. The values of $C_p$, $C_i$, and $C_d$ may, for example, determine the relative timing and magnitude of adjustments to the PowerAdj$_{PWM}$ adjustment value in response to a particular change in a current CPUMargin$_n$ reading at a given time n. The values of $C_p$, $C_i$, and $C_d$ may determine how quickly power adjustment may occur in response to CPUMargin$_n$.

In Equation (1), CPUMargin$_n$ represents a function of thermal design power ("TDP") for processor(s) 102, minus a predetermined processor thermal margin setpoint. Processor TDPs are the maximum amount of heat generated by processor that the processor is designed to dissipate under any workload. Hence, in examples, CPUMargin$_n$ corresponds to the thermal margin between the then-current CPU temperature, as provided to BMC 108 by thermal sensor 112, and the TDP of processor(s) 102, at any given $n^{th}$ interval during performance of method 200 of compute device 100. As noted, the current CPU temperature may be communicated to BMC 108 via connection 114. In examples, the intervals may be measured in seconds, such that each interval may be every one second, every ten seconds, or at a greater or lesser frequency.

In this example, PowerAdj$_{PWM}$ may take on any value between 0 and 255. The following Equation (3) reflects a calculation to normalize the PowerAdj$_{PWM}$ value to a percentage value PowerAdj$_{percentage}$:

$$PowerAdj_{percentage} = VEPP_{max} \times \frac{PowerAdj_{PWM}}{255} \qquad (2)$$

With continued reference to FIG. 2, after calculation of power adjustment value PowerAdj$_{PWM}$ in block 204, in block 206, BMC 108 communicates with power supply 106 via connection 116 to adjust the power supplied to processor(s) 102. In examples, connection 116 may be an inter-integrated circuit ("I2C") serial connection. Following this, a new power adjustment value PowerAdj$_{PWM}$ is calculated in block 204 and this process is repeated periodically during operation of compute device 100, using updated thermal readings from thermal sensor 112. In some examples, the periodic process of calculating PowerAdj$_{PWM}$ (block 204) and adjusting the output of power supply 106 may be performed once per second, although in other examples, the periodic process may be performed at different intervals, e.g., every ten or more seconds.

Figure 3:
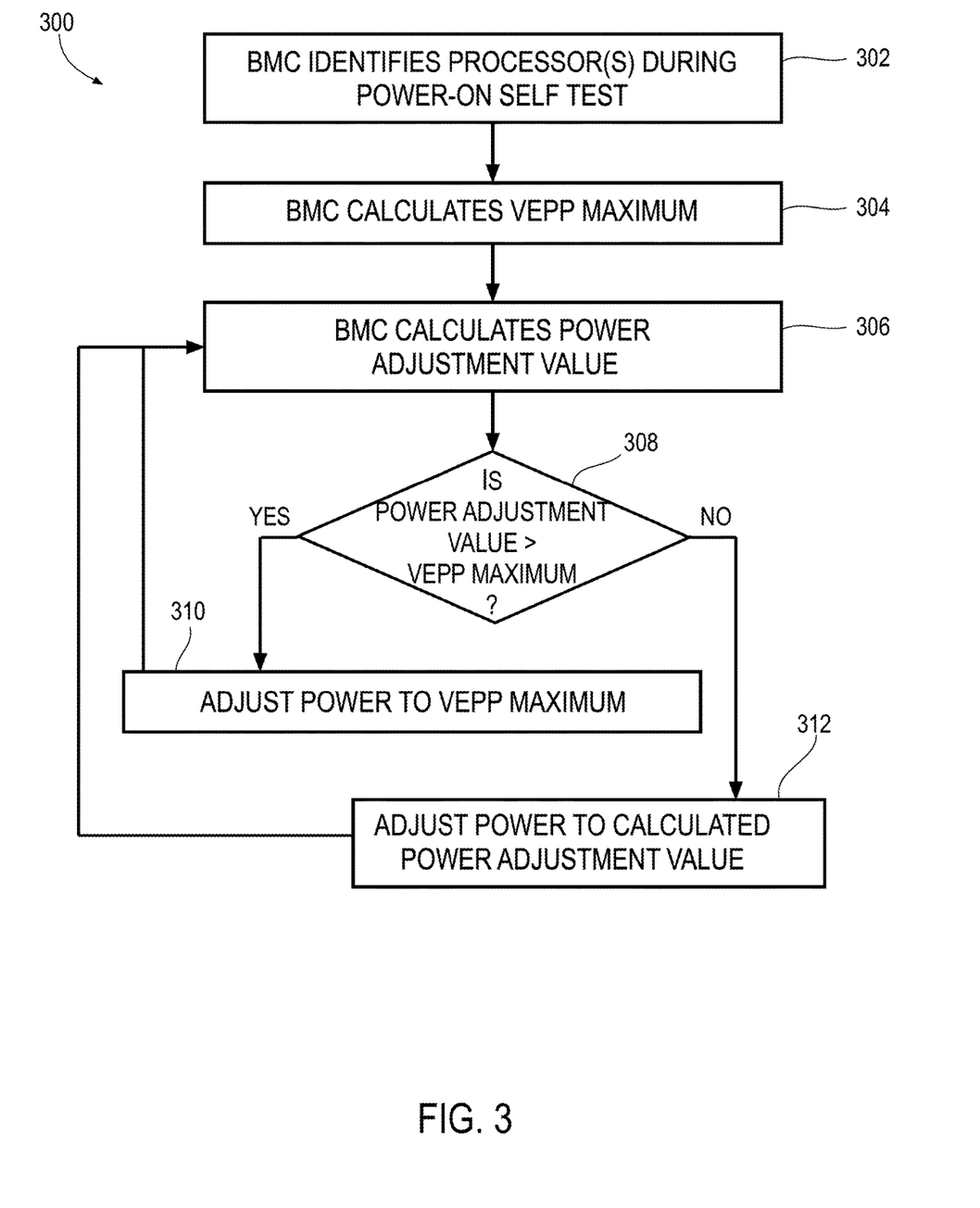
FIG. 3 is a flow diagram illustrating another method of operating a compute device according to one or more examples.

FIG. 3 is a flow diagram of a method 300 for operating compute device 100 according to one or more examples. In block 302 of method 300, BMC 108 identifies processor(s) 102. This identification may occur, for example, during the power-on self-test ("POST") of compute device 100, as described above. Next, in block 304, BMC 108 computes a variable enhanced processor performance maximum voltage for processor(s) 102 ("$VEPP_{max}$") based on the identification of processor(s) 102 in block 302, the upper thermal operating limit of processor(s) 102, as well as other system configuration variables, including, without limitation, the rating of power supply 106, the presence of other components within compute device 100 which may have an impact on thermal conditions in compute device 100, and the capacity of any cooling system in compute device 100 (not shown in FIG. 1). $VEPP_{max}$ represents the highest power level that may be provided to processor(s) 102 to enhance processor performance of processor(s) 102.

In examples, calculation of $VEPP_{max}$ for processor(s) 102 may performed by BMC 108 as a function of the maximum power level that can be delivered by power supply 106 ("$PSPowerDelivery_{max}$"), the processor thermal design power rating ("Processor TDP"), which is the maximum power that processor(s) 102 are designed to receive, and the number of processor(s) 102 included in compute device 100 ("Num Processors"). In one example, $VEPP_{max}$ may be calculated by BMC 108 according to the following Equation (1):

$$VEPP_{max} = \left(\frac{PSPowerDelivery_{max}}{ProcessorTDP \times NumProcessors} - 1\right) \times 100\% \quad (3)$$

After calculating $VEPP_{max}$ in block 304, next, in block 306, BMC 108 calculates a power adjustment value ("$PowerAdj_{PWM}$") for power supply 106. In one example, $PowerAdj_{PWM}$ is a proportional/integral/derivative ("PID") function calculated according to Equation (2) above.

With continued reference to FIG. 3, after calculation of power adjustment value $PowerAdj_{PWM}$ in block 306, in block 308 BMC 108 determines whether the calculated power adjustment value $PowerAdj_{PWM}$ is greater than or equal to the $VEPP_{max}$ value calculated in block 304. If so, then, in block 310, BMC 108 communicates with power supply 106 to adjust the power supplied to processor(s) 102 to the $VEPP_{max}$ value. On the other hand, if the $PowerAdj_{PWM}$ is not greater than the $VEPP_{max}$ value calculated in block 304, then, in block 312, BMC 108 communicates with power supply 106 to adjust the power to the calculated power adjustment value the $PowerAdj_{PWM}$. Following this, a new power adjustment value $PowerAdj_{PWM}$ is calculated in block 308. This process is repeated periodically during operation of compute device 100, using updated thermal readings from thermal sensor 112. In some examples, the periodic process of calculating $PowerAdj_{PWM}$ (block 306) and adjusting the output of power supply 106 may be performed once per second, although in other examples, the periodic process may be performed at different intervals, e.g., every ten or more seconds.

Figure 4:
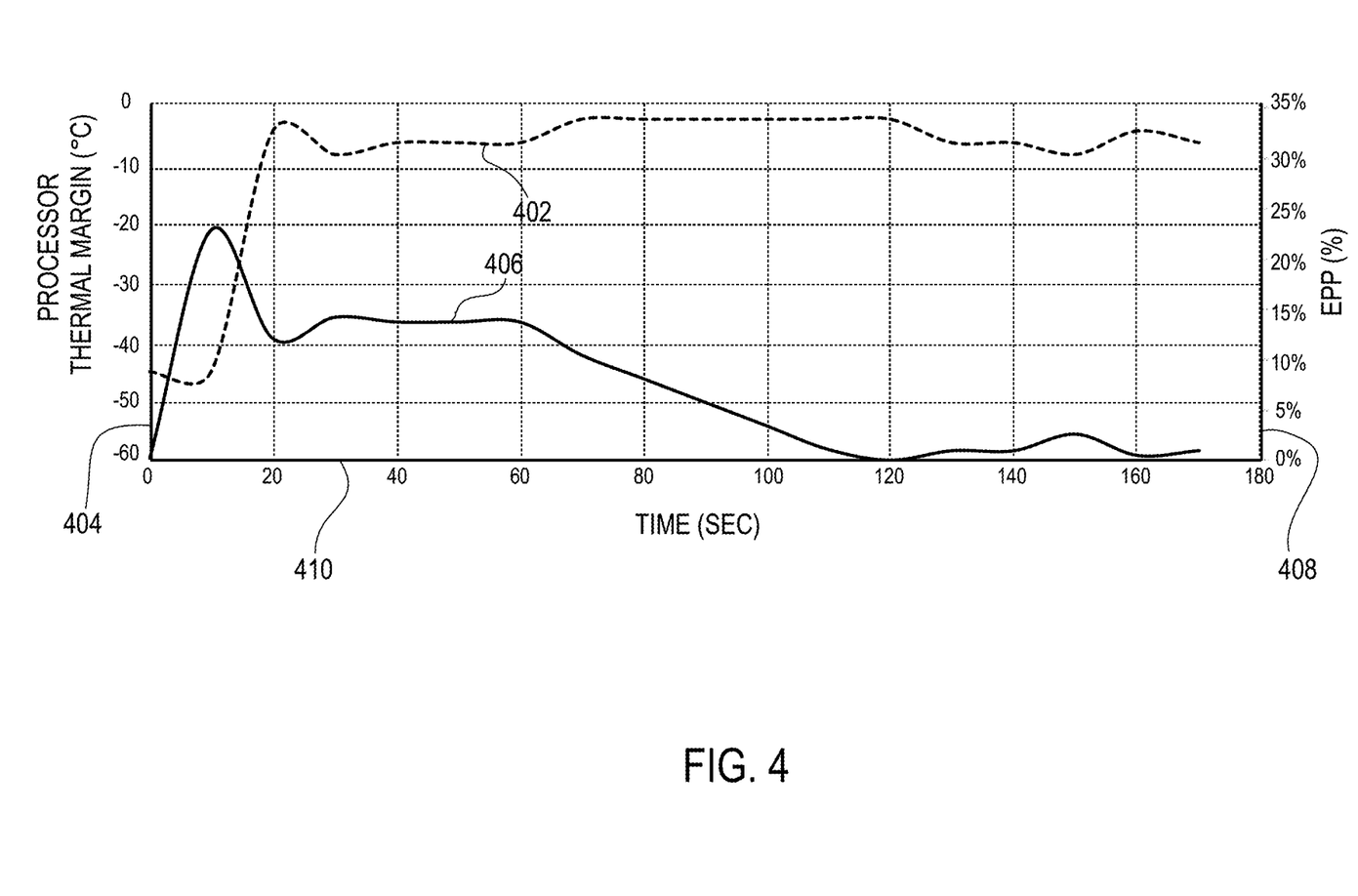
FIG. 4 is a plot illustrating enhanced processor performance achieved utilizing the example method from FIG. 2 based on control parameters according to one example.

FIG. 4 is a plot illustrating variable enhanced processor performance response according to one or more examples. In FIG. 4, curve 402 is a thermal margin curve representing processor thermal margin over time, i.e., the margin between actual processor temperature and the upper thermal operating limit of processor(s) 102, measured in ° C., as denoted on left-hand Y-axis 404. Curve 406 in FIG. 4 is an enhanced processor performance curve representing enhanced processor performance percentages provided during performance of method 200 from FIG. 2, measured in percentage, as denoted by right-hand Y-axis 408. X-axis 410 in FIG. 4 represents time, in seconds.

FIG. 4 shows the relative enhanced processor performance ("EPP") profile realized by performing the method of FIG. 2 in a particular example. The configuration parameters used in the example of FIG. 4 are set forth in the following Table 1:

TABLE 1

| PARAMETERS | |
|---|---|
| Processor Thermal Setpoint (° C.) | −6 |
| Proportional Gain Constant ($C_P$) | 5 |
| Integral Gain Constant( $C_i$) | 0.1 |
| Derivative Gain Constant ($C_d$) | 2 |
| $VEPP_{min}$ (%) | 0 |
| $VEPP_{max}$ (%) | 30 |
| PWM Minimum ($PowerAdj_{PWM}$ maximum) | 0 ($PowerAdj_{percentage}$ = 0%) |
| PWM Maximum ($PowerAdj_{PWM}$ minimum) | 255 ($PowerAdj_{percentage}$ = 100%) |

Using these parameters, the following Table 2 reflects the enhanced processor performance profile achieved during the first sixty seconds of operation depicted in FIG. 4. Table 2 reflects a stabilization of enhanced processor performance at approximately 14% during the interval from 30-60 seconds, following a more aggressive enhanced processor performance value of approximately 23% at the 10 second mark.

TABLE 2

| TIME | CPU MARGIN (° C.) | P TERM (PWM) | I TERM (PWM) | D TERM (PWM) | $PowerAdj_{PWM}$ (PWM) | EPP % |
|---|---|---|---|---|---|---|
| 0 | −45 | 195 | 0 | 0 | 0 | 0 |
| 10 | −45 | 195 | 0 | 0 | 195 | 23 |
| 20 | −4 | −10 | 0 | −82 | 103 | 12 |
| 30 | −8 | 10 | 0 | 8 | 121 | 14 |
| 40 | −6 | 0 | 0 | −4 | 117 | 14 |
| 50 | −6 | 0 | 0 | 0 | 117 | 14 |
| 60 | −6 | 0 | 0 | 0 | 117 | 14 |

In Table 2, the "P TERM" column refers to the calculation of the proportional component of Equation (2) above, namely: $C_p \times CPUMargin_n$, using the proportional gain constant $C_p$ from Table 1. This proportional component of Equation (2) reflects the proportion of the thermal margin curve 402 in the plot of FIG. 4.

The "I TERM" column of Table 2 refers to the calculation of the integral component of Equation (2) above, namely: $C_i \times \Sigma hd\ t=n-100"CPUMargin_n$, using the integral gain constant $C_i$ from Table 1. This integral component of Equation (2) corresponds with the integral of thermal margin curve 402 in the plot of FIG. 4 at a given time n.

The "D TERM" column of Table 2 refers to the calculation of the derivative component of Equation (2) above, namely:

$$C_d \times \frac{(CPUMargin_n - CPUMargin_{n-1})}{t_n - t_{n-1}},$$

using the differential gain constant $C_d$ from Table 1. This derivative component of Equation (2) corresponds with the derivative of thermal margin curve 402 in the plot of FIG. 4 at a given time n.

Figure 5:
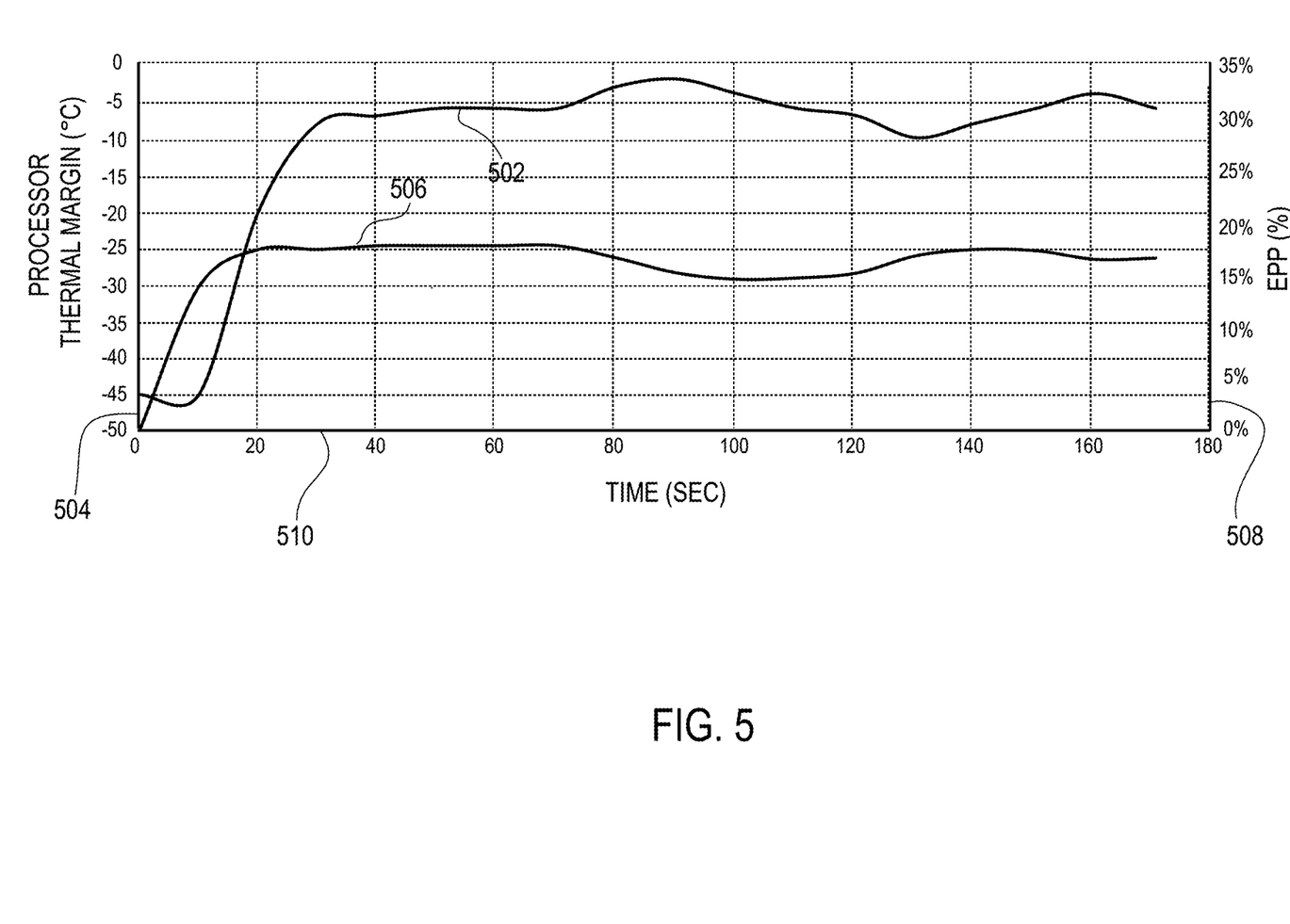
FIG. 5 is a plot illustrating enhanced processor performance achieved utilizing the example method from FIG. 2 based on control parameters according to another more example.

FIG. 5 is a plot illustrating variable enhanced processor performance response according to another example. In FIG. 5, curve 502 is a thermal margin curve representing processor thermal margin over time, i.e., the margin between actual processor temperature and the upper thermal operating limit of processor(s) 102, measured in ° C., as denoted on left-hand Y-axis 504. Curve 506 in FIG. 5 is an enhanced processor performance ("EPP") curve representing enhanced processor performance percentages provided during performance of method 200 from FIG. 2, measured in percentage, as denoted by right-hand Y-axis 508. X-axis 510 in FIG. 4 represents time, in seconds.

FIG. 5 shows the relative EPP profile realized by performing the method of FIG. 2 in a particular example. The configuration parameters used in the example of FIG. 5 are set forth in the following Table 3:

TABLE 3

| PARAMETERS | |
|---|---|
| Processor Thermal Setpoint (° C.) | −6 |
| Proportional Gain Constant (Cp) | 3 |
| Integral Gain Constant ($C_i$) | 2 |
| Derivative Gain Constant ($C_d$) | 0.5 |
| $VEPP_{min}$ (%) | 0 |
| $VEPP_{max}$ (%) | 30 |
| PWM Minimum (PowerAdj$_{PWM}$ maximum) | 0 (PowerAdj$_{percentage}$ = 0%) |
| PWM Maximum (PowerAdj$_{PWM}$ minimum) | 255 (PowerAdj$_{percentage}$ = 100%) |

The different proportional gain constant $C_p$, integral gain constant $C_i$ and derivative gain constant $C_d$ as compared with those values in the example of FIG. 4 and Table 1, results in a less aggressive control response through operation according to method 200 of FIG. 2. For example, whereas in the example of FIG. 4 thermal margin curve 402 exhibits an overshoot at approximately 20 seconds before stabilizing, in the example of FIG. 5 and Table 3, no such overshoot is observed. Generally speaking, with the less aggressive parameters of Table 3, EPP curve 506 in FIG. 5 tends to have smaller incremental changes in response to changes in thermal margin curve 502, as compared with EPP curve 406 in response to changes in thermal margin curve 402 in the example of FIG. 4.

Figure 6:
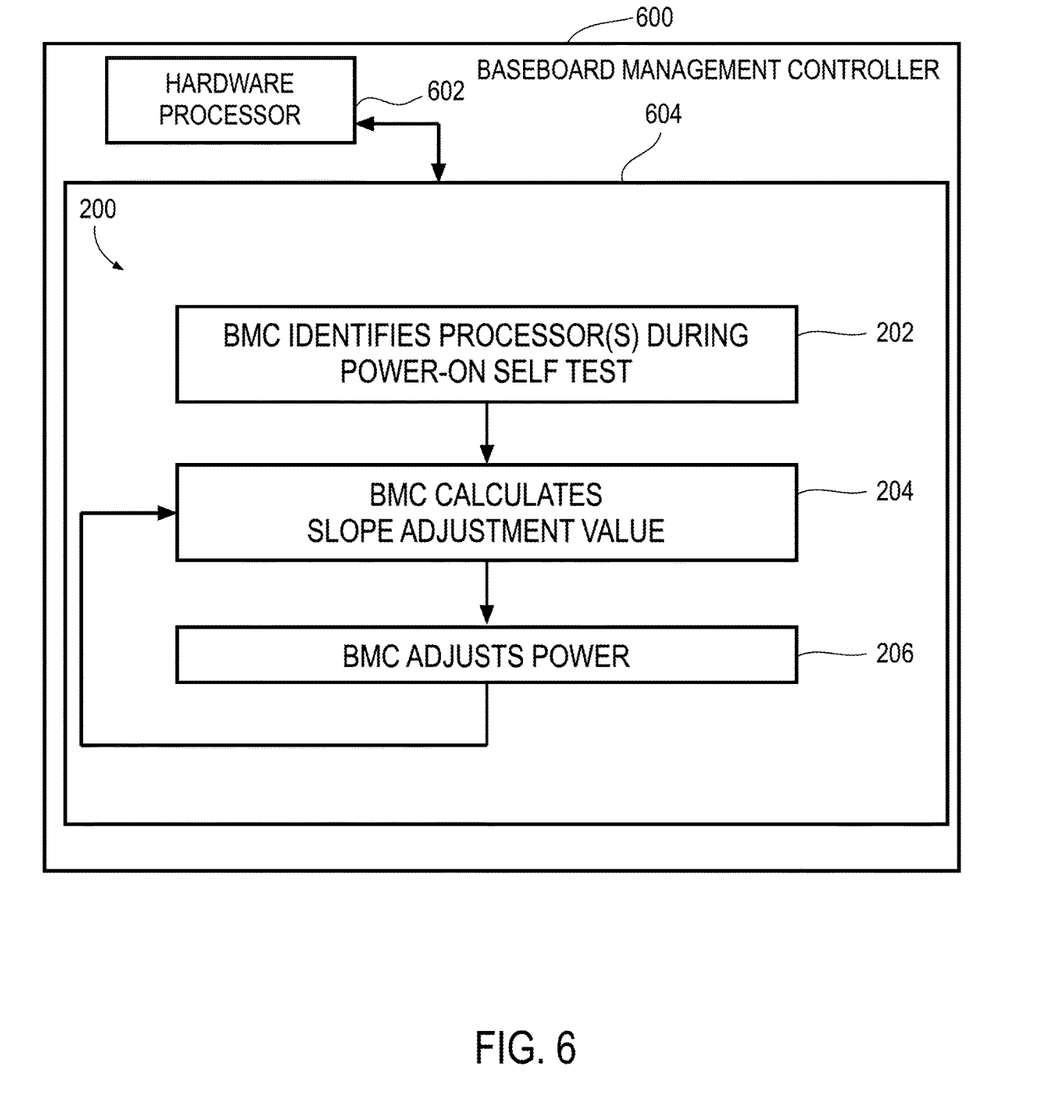
FIG. 6 is a block diagram illustrating a baseboard management controller ("BMC") implementing a method of controlling variable processor performance in a compute device according to one or more examples.

FIG. 6 is a block diagram illustrating a baseboard management controller ("BMC") 600 implementing method 200 of controlling variable processor performance in a compute device according to one or more examples. BMC 600 may include at least one hardware processor 602 and a machine-readable storage medium 604. As illustrated, machine readable storage medium 604 may store instructions, that when executed by hardware processor 602 (either directly or via emulation/virtualization), cause hardware processor 602 to perform method 200 described above with reference to FIG. 2.

Examples in the present disclosure may be directed to a non-transitory computer-readable medium storing computer-executable instructions and executable by one or more processors of the computer via which the computer-readable medium is accessed. A computer-readable media may be any available media that may be accessed by a computer. By way of example, such computer-readable media may comprise random access memory (RAM), read-only memory (ROM), electrically-erasable/programmable read-only memory (EEPROM), compact disc ROM (CD-ROM) or other optical disk storage, magnetic disk storage or other magnetic storage devices, or any other medium that may be used to carry or store desired program code in the form of instructions or data structures and that may be accessed by a computer. Disk and disc, as used herein, includes compact disc ("CD"), laser disc, optical disc, digital versatile disc ("DVD"), floppy disk and Blu-ray® disc where disks usually reproduce data magnetically, while discs reproduce data optically with lasers.

Note also that the software implemented aspects of the subject matter hereof are usually encoded on some form of program storage medium or implemented over some type of transmission medium. The program storage medium is a non-transitory medium and may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The claimed subject matter is not limited by these aspects of any given implementation.

The foregoing description, for purposes of explanation, uses specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. Examples herein are not intended to be exhaustive of or to limit this disclosure to the precise forms described. Many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method of operating a compute device, comprising:
identifying a processor of the compute device;
periodically calculating an adjustment value for the power supply as a function of a thermal margin of the processor, wherein the thermal margin reflects a difference between a temperature of the processor and upper thermal operating limit of the processor; and
adjusting power provided to the processor according to the calculated adjustment value.

2. The method of claim 1, wherein periodically calculating the adjustment value comprises periodically evaluating a thermal margin curve reflecting the thermal margin of the processor over time.

3. The method of claim 2, wherein periodically calculating the power adjustment value by periodically evaluating the thermal margin curve comprises periodically calculating a first term proportional to a value of the thermal margin curve at a given time n, a second term reflecting an integral of the thermal margin curve over a period of time ending at the given time n, and a third term reflecting a derivative of the thermal margin curve at the given time n.

4. The method of claim 1, wherein periodically calculating the adjustment value as a function of the thermal margin of the processor comprises periodically calculating an adjustment value PowerAdj$_{PWM}$ according to the equation:

$$PowerAdj_{PWM} = C_p \times CPUMargin_n +$$
$$C_i \times \sum_{t=n-100}^{n} CPUMargin_n +$$
$$C_d \times \frac{(CPUMargin_n - CPUMargin_{n-1})}{t_n - t_{n-1}}$$

where $C_p$ is a proportional gain constant, $C_i$ is an integral gain constant and $C_d$ is a derivative gain constant, $t_n$ is an $n^{th}$ time period, $t_{n-1}$ is an $(n-1)^{th}$ time period and wherein $CPUMargin_n$ is the thermal margin at the $n^{th}$ time period.

5. The method of claim 4, further comprising:
calculating a maximum adjustment value for the processor; and
in response to the calculated adjustment value exceeding the maximum adjustment value, adjusting the power level of the processor to the maximum adjustment value.

6. The method of claim 5, wherein the maximum adjustment value is calculated as a function of a maximum power of the power supply and a number of processors in the compute device.

7. The method of claim 1, wherein periodically calculating the adjustment value comprises calculating the adjustment value once per second during operation of the compute device.

8. A compute device, comprising:
at least one processor operable at variable performance levels based on a level of power supplied to the processor;
a power supply coupled to the processor for providing power to the processor;
a baseboard management controller coupled to the processor and the power supply;
wherein the baseboard management controller periodically calculates an adjustment value for adjusting the power supplied to the processor, the adjustment value being calculated as a function of a thermal margin of the processor, wherein the thermal margin reflects a difference between a temperature of the processor and an upper thermal operating limit of processor.

9. The compute device of claim 8, further comprising:
a thermal sensor providing the baseboard management controller with a temperature reading for the processor during operation.

10. The compute device of claim 9, wherein the baseboard management controller periodically calculates the adjustment value by evaluating a thermal margin curve that is a function of the thermal margin of the processor over time.

11. The compute device of claim 10, wherein the baseboard management controller periodically calculates the adjustment value $PowerAdj_{PWM}$ according to the equation $$PowerAdj_{PWM} = C_p \times CPUMargin_n +$$
$$C_i \times \sum_{t=n-100}^{n} CPUMargin_n +$$
$$C_d \times \frac{(CPUMargin_n - CPUMargin_{n-1})}{t_n - t_{n-1}}$$

where $C_p$ is a proportional gain constant, $C_i$ is an integral gain constant and $C_d$ is a derivative gain constant, $t_n$ is an $n^{th}$ time period, $t_{n-1}$ is an $(n-1)^{th}$ time period, and wherein $CPUMargin_n$ is the thermal margin at the $n^{th}$ time period.

12. The compute device of claim 11, wherein the baseboard management processor calculates a maximum adjustment value; and
in response to the calculated adjustment value exceeding the maximum adjustment value, adjusting the power to the maximum adjustment value.

13. The compute device of claim 12, wherein the baseboard management processor calculates the maximum adjustment value as a function of the maximum power of the power supply and a number of processors in the compute device.

14. The compute device of claim 8, wherein the baseboard management controller calculates the adjustment value every second during operation of the compute device.

15. A non-transitory computer-readable medium, tangibly embodying instructions executable by a hardware processor to:
identify a processor of the compute device;
calculate a maximum power to be delivered to the processor by a power supply during operation;
periodically calculate an adjustment value for the power supply as a function of a thermal margin of the processor, wherein the thermal margin reflects a difference between a temperature of the processor and upper thermal operating limit of the processor; and
adjust power provided to the processor according to the calculated adjustment value.

16. The non-transitory computer-readable medium of claim 15, wherein the computer-readable further tangibly embodies instructions executable by the hardware processor to:
evaluate a thermal margin curve reflecting the thermal margin of the processor over time.

17. The non-transitory computer-readable medium of claim 16, wherein the computer-readable further tangibly embodies instructions executable by the hardware processor to:
evaluate the thermal margin curve by calculating a first term proportional to a value of the thermal margin curve and the upper thermal operating limit of the processor at a given time n, a second term reflecting an integral of the thermal margin curve at the given time n, and a third term reflecting a derivative of the thermal margin curve at the given time n.

18. The non-transitory computer-readable medium of claim 15, wherein the computer-readable further tangibly embodies instructions executable by the hardware processor to:
calculate an adjustment value $PowerAdj_{PWM}$ according to the equation $$PowerAdj_{PWM} = C_p \times CPUMargin_n +$$
$$C_i \times \sum_{t=n-100}^{n} CPUMargin_n +$$
$$C_d \times \frac{(CPUMargin_n - CPUMargin_{n-1})}{t_n - t_{n-1}}$$

where $C_p$ is a proportional gain constant, $C_i$ is an integral gain constant and $C_d$ is a derivative gain constant, $t_n$ is an $n^{th}$ time period, $t_{n-1}$ is an $(n-1)^{th}$ time period, and wherein $CPUMargin_n$ is the thermal margin at the $n^{th}$ time period.

19. The non-transitory computer-readable medium of claim 18, wherein the computer-readable further tangibly embodies instructions executable by the hardware processor to:

calculate an adjustment value $PowerAdj_{PWM}$ once per second during operation of the compute device.

* * * * *